UNITED STATES PATENT OFFICE.

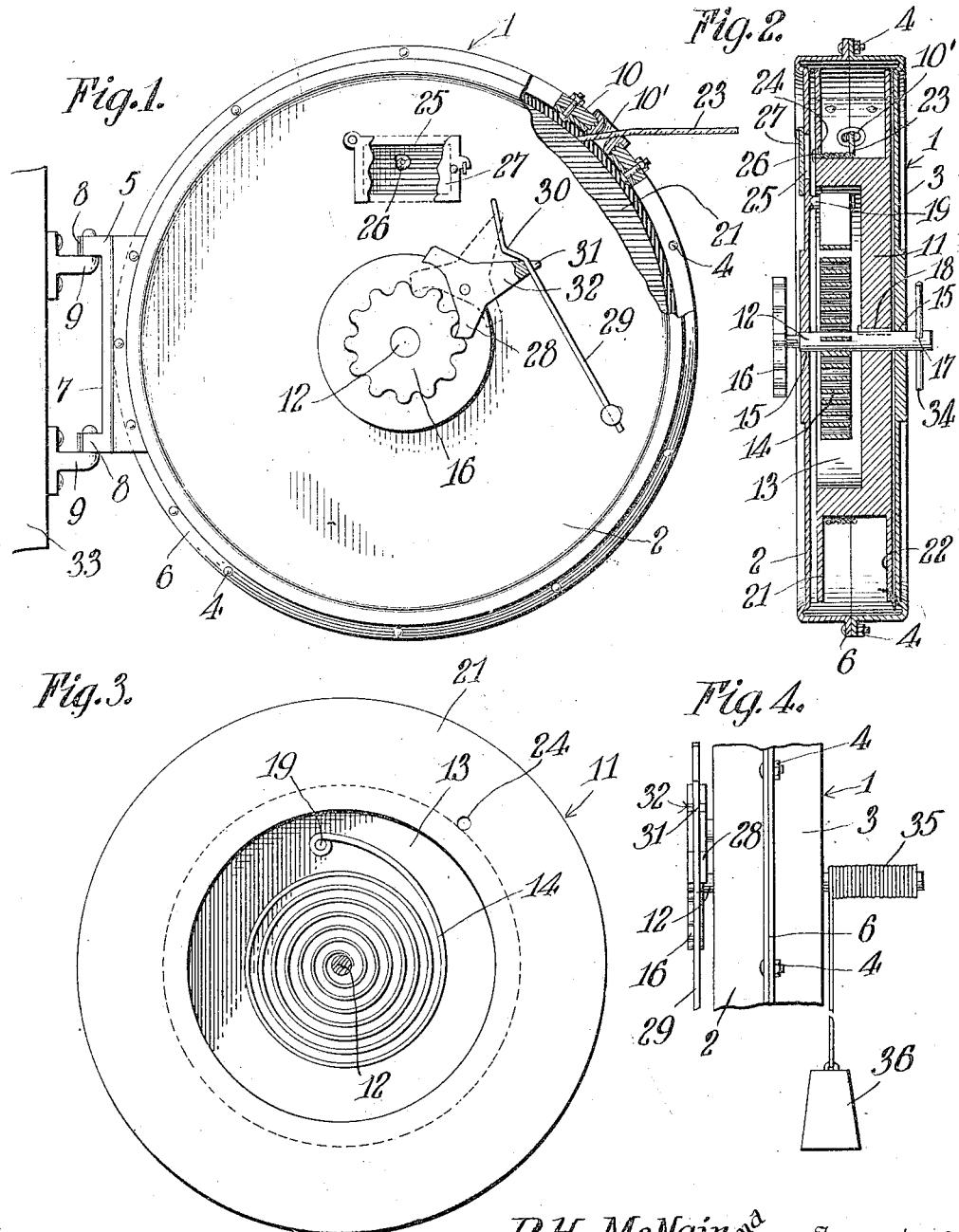

ROBERT H. McNAIR AND WILLIAM A. McNAIR, OF PEORIA, ILLINOIS.

CLOTHES-LINE REEL.

1,017,010.   Specification of Letters Patent.   Patented Feb. 13, 1912.

Application filed April 4, 1910. Serial No. 553,190.

*To all whom it may concern:*

Be it known that we, ROBERT H. MCNAIR and WILLIAM A. MCNAIR, citizens of the United States, residing at Peoria, in the county of Peoria and State of Illinois, have invented certain new and useful Improvements in Clothes-Line Reels; and we do declare the following to be a full, clear, and exact description of the invention, such as will enable others skilled in the art to which it appertains to make and use the same.

Our invention relates to clothes line reels, and has for its object to produce a device of this kind which will be very compact and simple and can be readily used by anyone and will automatically rewind the clothes line after use and safely keep the same from dampness and moisture.

Referring to the drawings, which illustrate the invention,—Figure 1 is a side elevation of the reel ready for use, parts being broken away and in section. Fig. 2 is a vertical sectional view through the same. Fig. 3 is a detail side elevation of the reel and spring; and Fig. 4 is a detail view of a slightly modified form of the device.

Referring more particularly to the drawings, 1 indicates the case or shell of the device, which is preferably cylindrical in shape and formed from two flanged disks 2 and 3, rigidly secured together as by means of rivets, 4. The rear end of the shell or casing, 1 is provided with a hinged portion, 5, which is preferably formed from a sheet of metal folded upon itself and secured to the flanges, 6, with the folded portion cut away as shown at 7, and formed into ears, 8, at its edges, which are adapted to engage with hinges or pintles, 9. The opposite side of the shell or case is provided with an opening through which the rope is passed, preferably formed from an eyelet, 10, which is bolted or otherwise secured to the edges of the sections 2 and 3.

Rotatably mounted within the shell is a drum, or reel, 11, which is rigidly secured to a shaft, 12, and preferably has one side recessed as shown at 13, within which is seated a spring, 14. The shaft is journaled concentrically within the casing as by means of perforations 15, and has one end provided with a ratchet wheel, 16, and its opposite end preferably provided with a perforation, 17. The drum is rigidly secured to the shaft in any suitable manner, as by means of the ordinary feather, 18, and one end of the spring is secured to the shaft and the other end is secured to one wall of the casing as by means of a stud or pin, 19, whereby when the drum is turned in one direction, as when the clothes line drawn down, the spring will be wound up and placed under sufficient tension to rewind the line as soon as its outer end has been released.

The periphery of the drum is preferably provided with flanges, 21 and 22, between which the clothes line, 23, is adapted to be wound when the drum is rotated. The line is secured upon the drum by passing one end through the opening, 10', thence through an opening 24, in the flange, 21, and thence through an opening, 25, in one side of the casing and tied into a knot, 26, which is adapted to be withdrawn through the opening, 25, until it engages with the outer side of the flange, 21, and thereby securely connects the line with the drum, sufficient space being left between that side of the drum and the casing to permit of the knot passing around with the drum without engaging with the casing. A hinged plate, 27, is preferably pivotally secured to the side of the casing in position to be swung over the opening, 25, and close the same after the knot, 26, has been formed and withdrawn in through said opening.

A double pawl, 28, is pivotally secured to the side of the casing in position for either end to engage with the teeth of the ratchet, 16, and thereby lock the drum against reverse rotation in either direction according to which end of the pawl is in engagement therewith. The pawl is held in its adjusted engagement by means of a leaf spring, 29, which has its free end bent into a substantially V-shaped shoulder, 30, which fits in a hole or opening, 31, in the tail, 32, of the pawl, the latter being substantially T-shaped as shown in Fig. 1. This spring holds the pawl with its tail in engagement with one side or the other of said shoulder, and the end of the pawl upon that side, in engagement with the ratchet. By carrying the spring through the opening 31, the walls of the opening serve to prevent lateral movement of the spring relative to the pawl so that disengagement of the same cannot occur. As the end of the spring is V-shaped, it will positively engage the pawl in either of its adjusted positions, as will be readily understood on reference to the full and dotted lines in Fig. 1. The opening 31 has its bottom wall constructed angular or abrupt, the other walls of the opening being inclined whereby when the angular end of the spring 30 is inserted through the opening it rides over the angular wall thereof, and projects therefrom so that the flat portion of the spring will contact with the inclined portion, thereby to hold the arms in engagement with the teeth of the ratchet wheel.

As above described, it will be seen that the reel can be made very compact and can be secured or mounted in any suitable position as upon a post, 33, or side of a building, and will automatically rewind the line after use. After the reel has been placed in position, and the line secured thereto, the free end of the line is drawn out and securely fastened at any desired point, the ratchet having been so set as to permit of the free movement of the drum in that direction. The line can then be stretched or given the desired tension by placing a rod, 34, in the hole, 17, and the shaft and drum reversely rotated to the desired amount, the pawl, 28, having been so set as to retain the parts in that position. By winding the spring before the line is connected with the drum, it is evident that as soon as the spring is released it will rotate the drum and thereby wind in the line ready to be withdrawn after it has been used.

Although we have shown the desired form of constructing our reel, it is evident that changes or alterations can be made therein, and we reserve the right to make all such variations as will come within the scope of the invention. For instance, instead of using the spring as above described, the shaft 12 may be extended to either side of the casing and provided with a coiled rope, 35, as shown in Fig. 4, to which a weight, 36, is secured for the purpose of rewinding the drum and drawing the line into the casing.

Having described our invention, we claim:—

A clothes line reel comprising a casing with a shaft extending through the same and having its opposite ends projecting therefrom, a spring actuated drum mounted on the shaft within the casing, means adapted to be connected to one of the projecting ends of the shaft so as to stretch the line, a ratchet wheel on the other projecting end of the shaft, a pawl pivoted to the casing having a pair of inwardly disposed arms extending in opposite directions to alternately lock the drum against reverse rotation in either direction, said pawl also having an outwardly disposed arm provided with an opening therein, one wall of the opening being abrupt or angular, the other wall of the opening being inclined, a spring having one end secured to the casing, the free end of the spring being angularly bent and adapted to ride over the abrupt portion of the opening and project therefrom so that the flat portion of the spring will contact with the inclined portion of the opening thereby to hold the teeth of the inwardly disposed arms in engagement with the teeth of the ratchet wheel.

In testimony whereof we have hereunto set our hands in presence of two subscribing witnesses.

ROBERT H. McNAIR.
WILLIAM A. McNAIR.

Witnesses:
　RUDOLF PFEIFFER,
　G. BOSSORMENY.